UNITED STATES PATENT OFFICE.

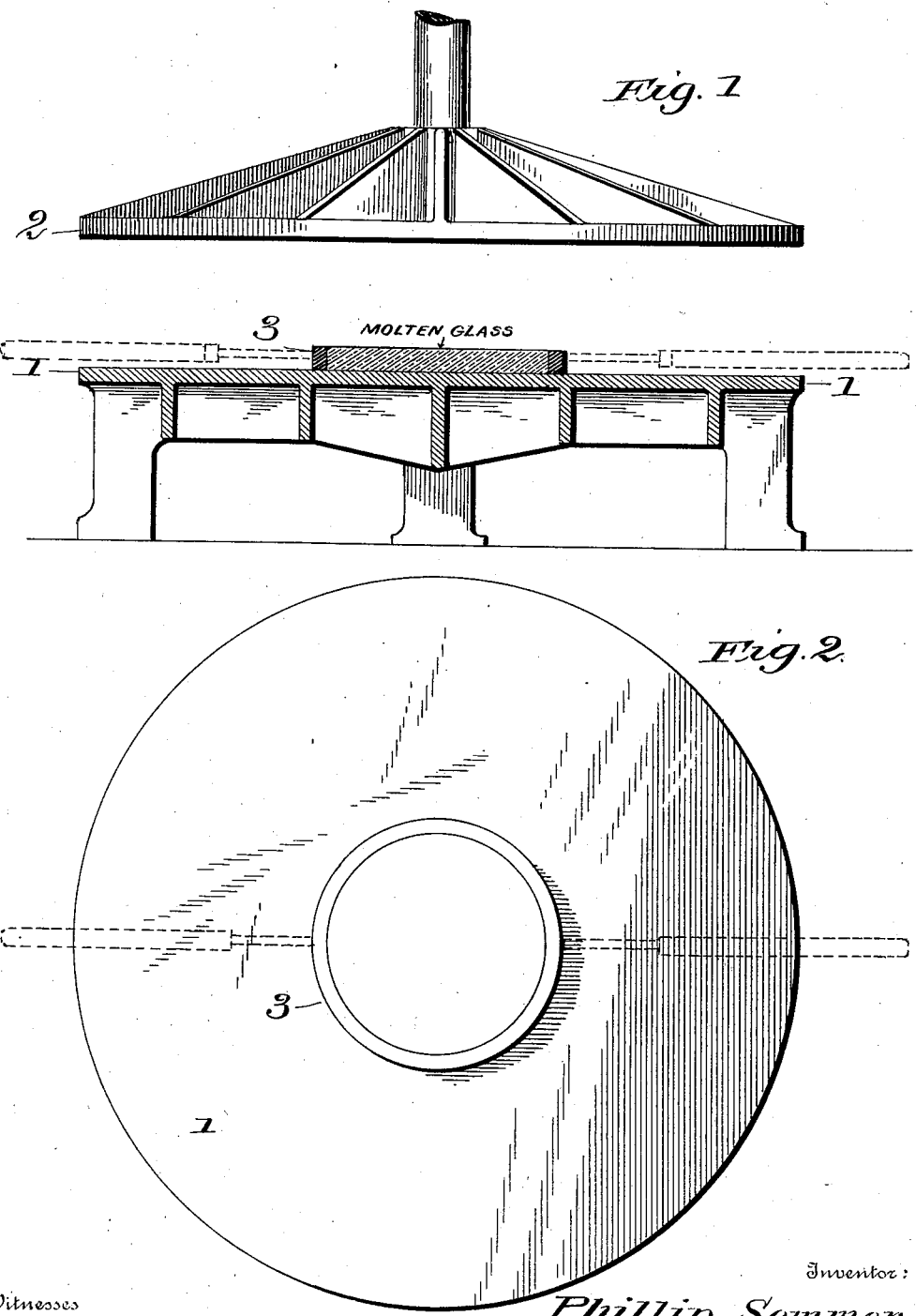

PHILLIP SEMMER, OF IRWIN, PENNSYLVANIA, ASSIGNOR TO MARY CAROLINE SEMMER.

PROCESS OF MAKING ROUGH PLATE-GLASS.

SPECIFICATION forming part of Letters Patent No. 628,120, dated July 4, 1899.

Application filed August 31, 1898. Serial No. 689,953. (No specimens.)

*To all whom it may concern:*

Be it known that I, PHILLIP SEMMER, a citizen of the United States, residing at Irwin, in the county of Westmoreland and State of Pennsylvania, have invented certain new and useful Improvements in Processes of Making Rough Plate-Glass; and I do hereby declare the following to be a full, clear, and exact description of the invention, such as will enable others skilled in the art to which it appertains to make and use the same.

My invention has relation to the process of making rough plate-glass for grinding and polishing purposes. In the manufacture of glass for this purpose the present practice is to either cast the molten glass on the end of a polished iron table and roll it into glass of required size and thickness or to gather the metal on the end of a blowpipe and blow the same into long cylinders, which are then split and flattened into sheets with the aid of a wooden flattening-block. Neither of these processes results in absolute flat sheets. The dragging of the iron roller and the wooden flattening-blocks over the top of the glass produces an uneven and wavy surface, requiring additional labor in the process of grinding the plates to a true plane.

The object of my present invention is to produce absolutely flat and approximately round plates of glass for grinding and polishing purposes without restriction to size and thickness, with a vitriformed edge adapted to fully cover a round grinding-table and guard and protect the edge of the glass plate with the vitriformed or unbroken fire-finished edge against breakage when cemented to the grinding-table and subjected to the grinding process.

In the accompanying drawings, Figure 1 is a side elevation, partly in section, of the table and plunger for forming the sheet of glass. Fig. 2 is a top plan of the table.

The machinery necessary to accomplish my process consists of a table 1 and a reciprocating plunger 2, located above the table, said plunger being adapted to be operated by any suitable means, preferably by hydraulic pressure. The under face of the plunger is preferably smooth and is flat and highly polished, the plunger being of the same dimensions as the table. The molding-ring 3 is adapted to be placed on top of the table 1 in the center of the same, as indicated in the drawings. The said ring 3 may be provided with suitable handles, as indicated by dotted lines, for readily removing the same. I do not, however, confine myself to the use of this ring, as it is obvious that an ordinary ladle full of glass cast in the center of the table for this purpose in a circular form pressed uniformly in common directions will also form an approximately round plate of glass.

The process is as follows: The plunger is elevated. The ring 3 is placed in position in the center of the table-top 1, or the glass is cast in the center of the table-top, as above indicated. When the ring is used, the molten glass is poured into the ring. The ring is then removed and the plunger 2 is caused to descend, and the batch of glass is thus pressed in equal directions and is flattened out on top of the table 1. The sheet thus formed is approximately a round disk of glass, and the disk may be pressed out and given any required thickness. It will thus be seen that the resultant sheet of glass will be absolutely flat on both sides and is in proper condition for grinding and polishing, as above set forth. The edge of the glass so formed is unbroken and vitriformed or fire-finished. The sheet may be secured to the top of a round grinding and polishing table by means of cementing the vitriformed edge to the table. Thus the plate is not exposed to the danger of cracking, which occurs in exposing the raw diamond-cut edge of the glass plate for this purpose.

Having thus described my invention, what I claim as new, and desire to secure by Letters Patent, is—

1. The process of producing sheets of glass, consisting in casting the molten glass in a bottomless mold on a flat table, then removing the mold and pressing the glass between a flat surface and the table, substantially as described.

2. The process of producing flat sheets of glass, consisting in casting the molten glass in a bottomless mold on a flat table, then removing the mold and pressing the glass between a flat surface and the table, then making unbroken vitriformed or fire-finished edges to the glass, substantially as described.

3. The process of producing an approximately round sheet of glass with an unbroken fire-finished edge, consisting in casting the molten glass on a table and pressing the same between flat surfaces to the required thickness, substantially as described.

4. The process of producing flat sheets of glass, consisting of casting the molten glass in a bottomless mold on a flat table, then removing the mold and pressing the glass to the desired thickness by a vertically-reciprocating plunger provided with a smooth and flat contact-face, substantially as described.

In testimony whereof I affix my signature in presence of two witnesses.

PHILLIP SEMMER.

Witnesses:
EMIL FISCHER,
I. BALEZER.